United States Patent [15] 3,666,033
Haug [45] May 30, 1972

[54] STEERING MECHANISM FOR TRACKED VEHICLES, ESPECIALLY SNOW MOBILES

[72] Inventor: Walter Haug, Blaustein, Germany

[73] Assignee: Karl Kassbohrer Fahrzeugwerke, Ulm (Donau), Germany

[22] Filed: June 1, 1970

[21] Appl. No.: 42,141

[30] Foreign Application Priority Data

June 3, 1969 Germany........................P 19 28 332.0

[52] U.S. Cl.............................................180/6.48, 74/496
[51] Int. Cl..........................................................B62d 11/04
[58] Field of Search....................................180/6, 48; 74/496

[56] References Cited

UNITED STATES PATENTS 3,362,493  1/1968  Davis et al. ..................180/6.48 X
3,224,196  12/1965  Bennett.........................180/6.48 X
1,254,057  1/1918  Moore...............................180/6.48
2,941,609  6/1960  Bowers et al. ....................180/6.48
3,161,245  12/1964  Thoma..............................180/6.48
3,550,708  12/1970  Paramythioti ....................180/6.48

Primary Examiner—Benjamin Hersh
Assistant Examiner—John A. Pekar
Attorney—Woodhams, Blanchard and Flynn

[57] ABSTRACT

Steering mechanism for a vehicle having independently driven wheels, especially a tracked vehicle. Assuming the wheels or tracks on opposite sides of the vehicle to be independently driven by the speed controllable motors, such as hydraulic motors, one respective end of suitable push-pull rods are connected to the controls of such motors for operation of same in forward, reverse directions and for placement in neutral position. A steering wheel is connected by linkage to a rotatable substantially vertically, positioned shaft and a crank is mounted by its apex pivotally to one end of said shaft, the axis of such pivoting being substantially perpendicular to the axis of rotation of said shaft. When in one selected pivotal position, a first arm of said crank is substantially coaxial with the axis of said shaft and the free end of said arm is connected to said rods. The free end of the other arm of said crank is connected to a manual control by which the crank can be moved on its pivot. Thus rotation of said shaft by the steering wheel when said first arm is coaxial with the shaft effects no movement of said push-pull rods and same remain in neutral position. Movement of said crank on said pivot will move said rods to control the motors to forward, reversing, or neutral positions. Rotation of said shaft when said crank is in a position for forward or reversing operation will alter the respective degree of positioning of the respective motors to effect the desired steering function.

4 Claims, 3 Drawing Figures

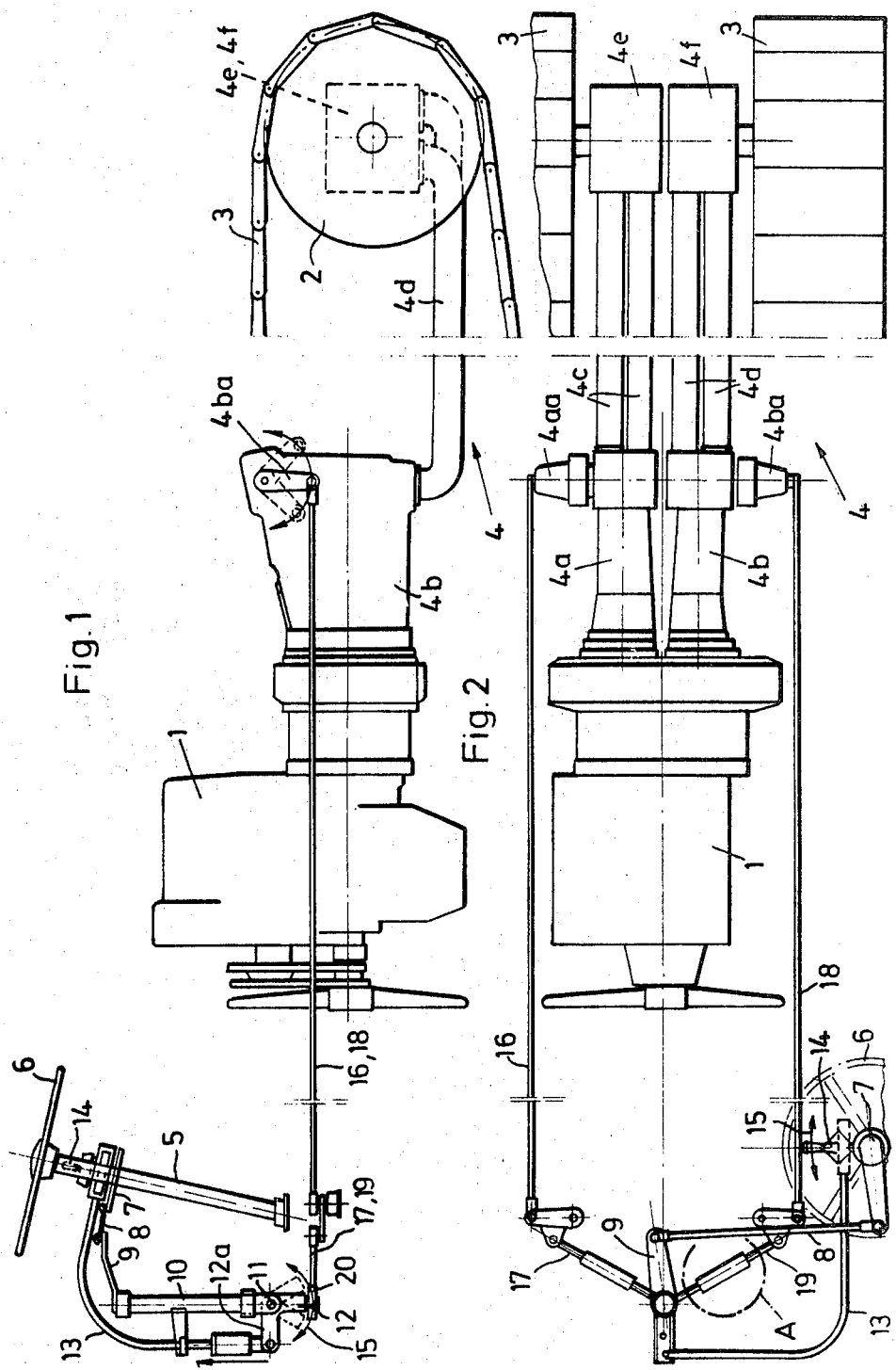

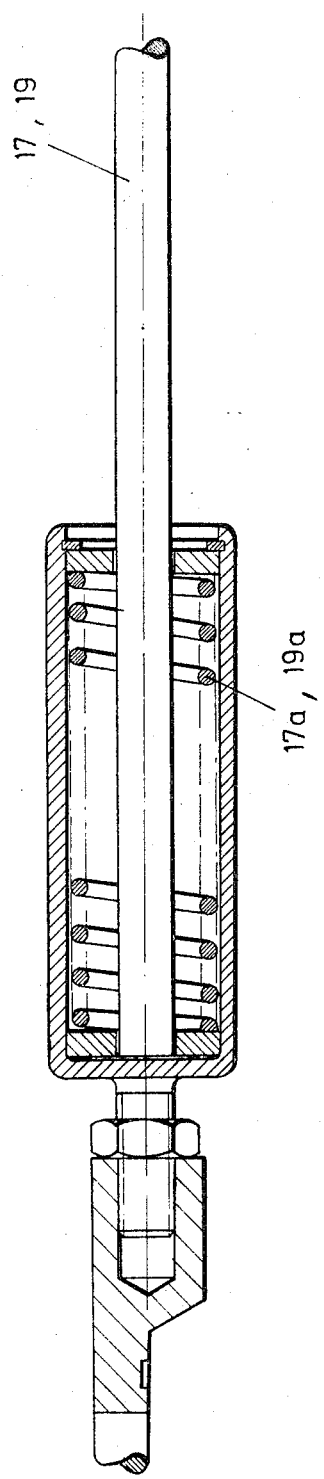

STEERING MECHANISM FOR TRACKED VEHICLES, ESPECIALLY SNOW MOBILES

The invention refers to a steering mechanism for tracked vehicles, especially snow track vehicles, equipped with hydraulic pumps which can be synchroniously operated by an engine and hydraulic motors through two fluid transmissions, one for each respective track. Each of said transmissions has a power drive regulator adjustable to a maximum or zero position by means of a suitable operating device.

Steering mechanisms of the above type, manufactured by today's motor vehicle industry for tracked vehicles, are operated in such a way that the driver controls a power drive regulator with each hand through respective operating elements. This manner of steering a vehicle is distinctly different from using a steering wheel and, therefore, the driver is in need of a training period of considerable length to assure a trouble-free operation of the tracked vehicle. In case the trained operator is unavailable due to reasons such as illness, and no substitute driver with equally careful training is available, the tracked vehicle is temporarily out of operation. Should an untrained driver attempt to steer the tracked vehicle, its motions may be very jerky, which could result in possible damage to the vehicle itself. Particularly, in equipment for the care of cinder tracks where an additional roller is placed respectively in front of or behind the track drive of the vehicle, very high tension and bending forces are created by jerky steering motions. These act on the roller supports with frequently damaging results.

Tracked vehicles have also been known to come equipped with a steering mechanism with steering column and respectively dependent steering transmissions between the engine and the tracks (German Pat: No. DBP883844). This type of steering transmission has two disk clutches, the clutch casings of which can be synchronously driven by the engine. In the straight forward position of the steering column, the two tracks are coupled directly with the motor by means of a clutch lever in a first shift position shifted to neutral in a second position, and third a brake position. Depending on the direction in which the steering column is turned, either the right or the left track is first shifted to neutral and with further engagement of the column to the braking position so that the vehicle is now driven only by the opposite track which remains coupled to the engine, and the vehicle is gradually turned about a point which lies below the braked track.

It is obvious that even this vehicle can be entrusted only to a driver with a high level of training and experience. Irrespective of this consideration, the steering transmission of this conventional steering mechanism is large and resultingly heavy in design, so that the problem of building them into snow tracked vehicles frequently can be solved only with extreme difficulty, by some means wherein their weight will be evenly distributed over the entire track area with a relatively small specific weight factor.

It is the function of this particular invention to further develop and improve a steering mechanism of the type mentioned above with simple apparatus, so as to assure an easy and effective operation of the vehicle by any driver. This is made possible by designing the operating elements of the power drive regulator in such a way to allow them to be controlled by the steering motions of a steering column in a continuously counter clockwise fashion and by means of a switch lever of the transmission system in clockwise fashion.

On the basis of this type of design of the steering mechanism, the operation of a single switch lever determines the speed of rotation of both tracks in the same sense of rotation, while one turning motion of the steering column influences the speed of rotation in the opposite sense in the desired ratio. In this manner, the steering capabilities of tracked vehicles are comparable to those of a vehicle with steerable wheels, so that any driver is capable of operating the track vehicle with safety and in an accurate manner. In a preferred embodiment, the operating elements of the power drive regulator are coupled through a freely pivotal joint with the free end of a crank arm which is turnable by means of the steering column, whereby the crank arm can be swung by the shift lever of the transmission system about a joint from an angular position on one side of a crank shaft to an, at least approximately, coaxial position, corresponding to the neutral position of the shift lever. On the basis of this design, the power drive regulators will not be moved by the turning of the steering column in either one or the other direction, as long as the crank arm which controls them is in coaxial position with the crank shaft, i.e. as long as the shift lever of the transmission system is in neutral. By this means it is assured that neither track can move in forward or reverse direction when the vehicle is stopped with its motor running, should the driver, while remounting the vehicle, inadvertently turn the steering wheel in any direction.

It is particularly useful when the operating elements of the power drive regulator can be moved in a conventional manner beyond the neutral position into a second maximum position, by reversing the direction of force of the respective hydraulic pump, and when the crank arm can be swung about angularly on both sides out of the position which is at least approximately coaxial with the crank shaft. In this manner, a continuous change as well as adjustment of the return speed of the tracks is assured, while maintaining the easy maneuverability of the vehicle.

It is also intended that the operating elements of the power drive regulator in each case is coupled with the crank arm by means of elastically extendable steering rods. This allows the one power drive regulator a sufficient adjustment area, while the other power drive regulator has already reached its maximum position in the course of one pulling motion of the appropriate steering rods.

A preferred embodiment of the invention is illustrated in the attached drawing wherein:

FIG. 1 is a schematically represented side view of a steering mechanism,

FIG. 2 is a schematically represented top view of the steering mechanism according to FIG. 1, and FIG. 3 is a cross section through the detail A of FIG. 2 shown in an enlarged scale.

The drawing shows an engine 1 of a tracked vehicle, particularly a snow track vehicle, and a transmission system 4, comprising two fluid transmission, which is positioned between the engine 1 and two driving wheels 2 of two tracks 3. In each case, they show hydraulic pumps 4a and 4b, respectively attached to the engine by flanges, and hydraulic motors 4e and 4f, respectively connected to the pumps by means of tubing 4c and 4d for hydraulic fluid, through which the wheel 2 of the adjacent track 3 is driven.

The transmission system 4 can be controlled through a steering column 5 and an attached steering wheel.

The steering column 5 is coupled by means of a lever system 7, 8, 9 with a rotatable shaft 10, supported on the chassis (not illustrated) in substantially vertical position, forming a crank shaft for a crank arm 12 which can be swiveled about a horizontal pivot axis 11.

A second arm 12a extends perpendicularly from the crank arm 12, is made either as a solid piece or at least solidly attached for turning purposes, and has a flexible cable 13 attached thereto which can be operated by a shift lever 14 positioned near the steering wheel 6. By moving the shift lever 14 which acts on the transmission system 4 in the direction of the double arrow 15, the crank arm 12 can be pivoted about axis 11 out of the coaxial position (indicated in FIG. 1 with solid lines) with respect to the crank shaft 10. Said pivoting can be in both directions of the double arrow 15 as is indicated in FIG. 1 with broken and dotted lines.

Each of the hydraulic pumps 4a, 4b of the transmission system 4 can be alternately controlled by a pivotal operation of element 4aa and respectively 4ba of a power drive regulator in proportion to the power regulation and the direction of drive. The operating elements 4aa, 4ba are in each case connected through the appropriate steering rods 16, 17 and respectively 18, 19 with the free end of the crank arm 12 by means of a universal coupling 20.

The illustration shows the shift lever 14 of the transmission system in a central neutral position, corresponding to the position of the crank arm 12 coaxial with the steering column indicated in FIG. 1 by solid lines. In this coaxial position of the crank arm 12, the operation elements 4aa and 4ba of the power drive regulator are in their zero positions, likewise indicated in the illustrations by solid lines. The operation elements 4aa, 4ba of the power drive regulator remain in such zero positions even when the steering wheel 6 is turned while the crank arm 12 is coaxial with the crank shaft 10.

The operating elements 4aa, 4ba can be moved by the appropriate steering rods 16, 17 and 18, 19 respectively out of the zero position in the one swivel direction to a first maximum position, indicated by broken lines, and in the opposite direction beyond the zero position to a second maximum position indicated by dotted lines. The pivotal position of the operating elements 4aa, 4ba on the one side of the zero position correspond to the forward rotation and on the other side of the zero position to the reverse rotation of the hydraulic motors 4e, 4f.

A turning of the shift lever 14 in the one or the other direction of the double arrow 15, causes simultaneous pivotal and steering motions of the operating elements 4aa, 4ba in the same direction.

These swivel motions of the operating elements 4aa, 4ba also take place synchronously as well as in the same amplitude, when the shift lever 14 of the transmission is changed while the steering column 5 is in the straight forward position.

However, the pivotal motions of the operating elements 4aa, 4ba take place in the opposite manner, when the steering wheel 6 is turned in the one or the other direction while the crank arm 12 is in an angular position with respect to the crank shaft 10.

In case of an opposite pivotal motion of the operating elements 4aa, 4ba, should one of the latter have reached the maximum position, the other operating elements can nevertheless be further turned, because the steering rods 16, 17 and respectively 18, 19 can be extended elastically. As is illustrated in FIG. 3, the steering rods 17, 19 are divided into rod sections which can be moved coaxially to each other and can be extended against the force of springs 17a and 19a respectively.

The invention is in no way restricted to the illustrated embodiment. For example, it would be possible to equip the fluid transmission 4 simply with hydraulic pumps developing a direction of rotation determined by a regulatory system, also with the hydraulic motors, by which the direction of drive of drive of the hydraulic pumps can be reversed.

The embodiments of the invention in which an exclusive property or privilege is claimed are defined as follows:

1. In a vehicle having two ground engaging elements spaced transversely thereof, vehicle propulsion means comprising an engine and a pair of variable speed ratio power transmissions connecting said engine to said ground engaging elements to drive said vehicle, transmission control means to vary the speed ratios thereof and manually operable speed control means, the improvement comprising:

manually operable steering control means comprising a rotatably mounted steering wheel, a pivotally mounted crank-shaft, means connecting said steering wheel to said crankshaft to effect a rotational movement of said crankshaft in response to a turning motion of said steering wheel and a two arm crank pivotally secured to said crankshaft about an axis extending transversely of the axis of said crankshaft, said two arm crank having a first arm connected to said manually operable speed control means to thereby permit a manual control of the movement of said two arm crank about said axis thereof and a second arm connected to said transmission control means to (1) establish a given proportionality between the speed ratios in response to said turning motion of said steering wheel and to (2) establish said speed ratios of said transmission jointly in response to a manual control of said speed control means.

2. A vehicle according to claim 1, wherein said pair of transmissions each have a control arm thereon;
   wherein said transmission control means includes a pair of control linkage means connecting said second arm of said two arm crank to each of said control arms on the respective ones of said transmissions; and
   wherein each of said control linkage means includes means defining an elastically extendible rod.

3. A vehicle according to claim 1, wherein said second arm of said two arm crank is pivotable in a plane parallel with the axis of said crankshaft and on opposite sides of and through a position wherein the longitudinal axis of said second arm is in parallel alignment with said crank-shaft axis in response to a manual operation of said speed control means, the speed output of said transmissions being zero when said second arm is in parallel alignment to said crankshaft.

4. In a vehicle having two ground engaging elements spaced transversely thereof, vehicle propulsion means comprising an engine and a pair of variable speed ratio power transmissions connecting said engine to said ground engaging elements to drive said vehicle, transmission control means to vary the speed ratios thereof and manually operable speed control means, the improvement comprising:

manually operable steering control means comprising a rotatably mounted steering wheel, a pivotally mounted crankshaft, means connecting said steering wheel to said crankshaft to effect a rotational movement of said crankshaft in response to a turning motion of said steering wheel and crank means pivotally secured to said crankshaft about an axis extending transversely of the axis of said crankshaft, first linkage means connecting said crank means to said manually operable speed control means to thereby permit a manual control of the movement of said crank means about said axis thereof and second linkage means connecting said crank means to said transmission control means to (1) establish a given proportionality between the speed ratios in response to said turning motion of said steering wheel and to (2) establish said speed ratios of said transmissions jointly in response to a manual control of said speed control means.

* * * * *